Figure 1:
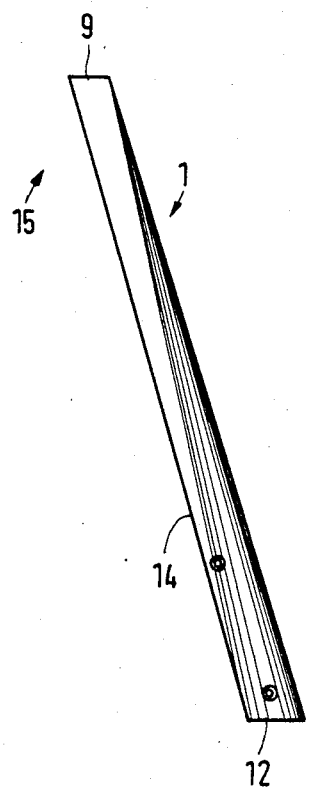

United States Patent [19]

Spranger

[11] Patent Number: 4,687,416
[45] Date of Patent: Aug. 18, 1987

[54] METHOD AND DEVICE FOR DECREASING THE FLOW RESISTANCE ON WINGS PARTICULARLY AEROFOILS AND BLADES OF TURBOMACHINES EXPOSED TO GAS FLUX SUCH AS AIR

[76] Inventor: Günther Spranger, Wagnerstrasse 2, D-2000 Hamburg, Fed. Rep. of Germany

[21] Appl. No.: 699,226
[22] PCT Filed: Feb. 10, 1982
[86] PCT No.: PCT/DE82/00026
 § 371 Date: Sep. 27, 1982
 § 102(e) Date: Sep. 27, 1982
[87] PCT Pub. No.: WO82/02694
 PCT Pub. Date: Aug. 19, 1982

Related U.S. Application Data

[63] Continuation of Ser. No. 432,943, Sep. 27, 1982, abandoned.

[30] Foreign Application Priority Data

Feb. 13, 1981 [DE] Fed. Rep. of Germany ....... 3105183

[51] Int. Cl.$^4$ ............................................. B64C 11/16
[52] U.S. Cl. ............................. 416/223 A; 416/200 R
[58] Field of Search .......... 416/223 A, 231 R, 231 A, 416/231 B, 200 R, 196 R, 234

[56] References Cited

U.S. PATENT DOCUMENTS

| | | | |
|---|---|---|---|
| 1,021,822 | 4/1912 | Broussouse | 416/200 |
| 1,344,496 | 6/1920 | Flattum | 416/200 |
| 1,684,567 | 9/1928 | Wragg | 416/200 |
| 1,775,568 | 9/1930 | Piesik | 416/228 |
| 1,779,026 | 10/1930 | Wragg | 416/196 R |
| 1,804,434 | 5/1981 | Reed | 416/228 |
| 1,874,545 | 8/1932 | Koch | 416/200 |
| 2,045,383 | 6/1936 | Faber | 416/231 B |
| 2,135,887 | 11/1938 | Fairey | 416/231 B |
| 3,606,579 | 9/1971 | Mehus | 416/200 R |
| 4,102,600 | 7/1978 | Schwab | 416/231 R |

FOREIGN PATENT DOCUMENTS

| | | |
|---|---|---|
| 357735 | 8/1922 | Fed. Rep. of Germany . |
| 390486 | 2/1926 | Fed. Rep. of Germany . |
| 443163 | 4/1927 | Fed. Rep. of Germany . |
| 451027 | 10/1927 | Fed. Rep. of Germany . |
| 1169303 | 12/1961 | Fed. Rep. of Germany . |
| 1200691 | 2/1962 | Fed. Rep. of Germany . |
| 1267989 | 11/1965 | Fed. Rep. of Germany . |
| 2451887 | 10/1974 | Fed. Rep. of Germany . |
| 1962159 | 12/1977 | Fed. Rep. of Germany . |
| 2828162 | 6/1978 | Fed. Rep. of Germany . |
| 820826 | 11/1937 | France .......................... 416/231 |
| 15896 | 7/1911 | United Kingdom ............ 416/231 B |
| 176842 | 3/1922 | United Kingdom ................ 416/231 |
| 388827 | 3/1933 | United Kingdom . |
| 1479879 | 1/1978 | United Kingdom . |

Primary Examiner—Robert E. Garrett
Assistant Examiner—John Kwon
Attorney, Agent, or Firm—Andrus, Sceales, Starke & Sawall

[57] ABSTRACT

A device and method for reducing the flow resistance of air foils utilizes one or more flow compressors on the leading edge of the foil. The gas flowing in front of the leading edge is compressed and is expanded on the upper surface of the wing so that through induction of the expanded gas, gas from the area of the lower surface of the wing is admixed to increase the flow on the upper surface of the wing. The direction of the admixed gases is such that the velocity of the gas flowing out at the trailing edge of the wing is identical over the entire wing length. The separation point of the flow is displaced towards the trailing edge of the wind and, in the direction of the tip of the wing, the pressure of the gas flowing over the upper surface of the wing is increased.

5 Claims, 14 Drawing Figures

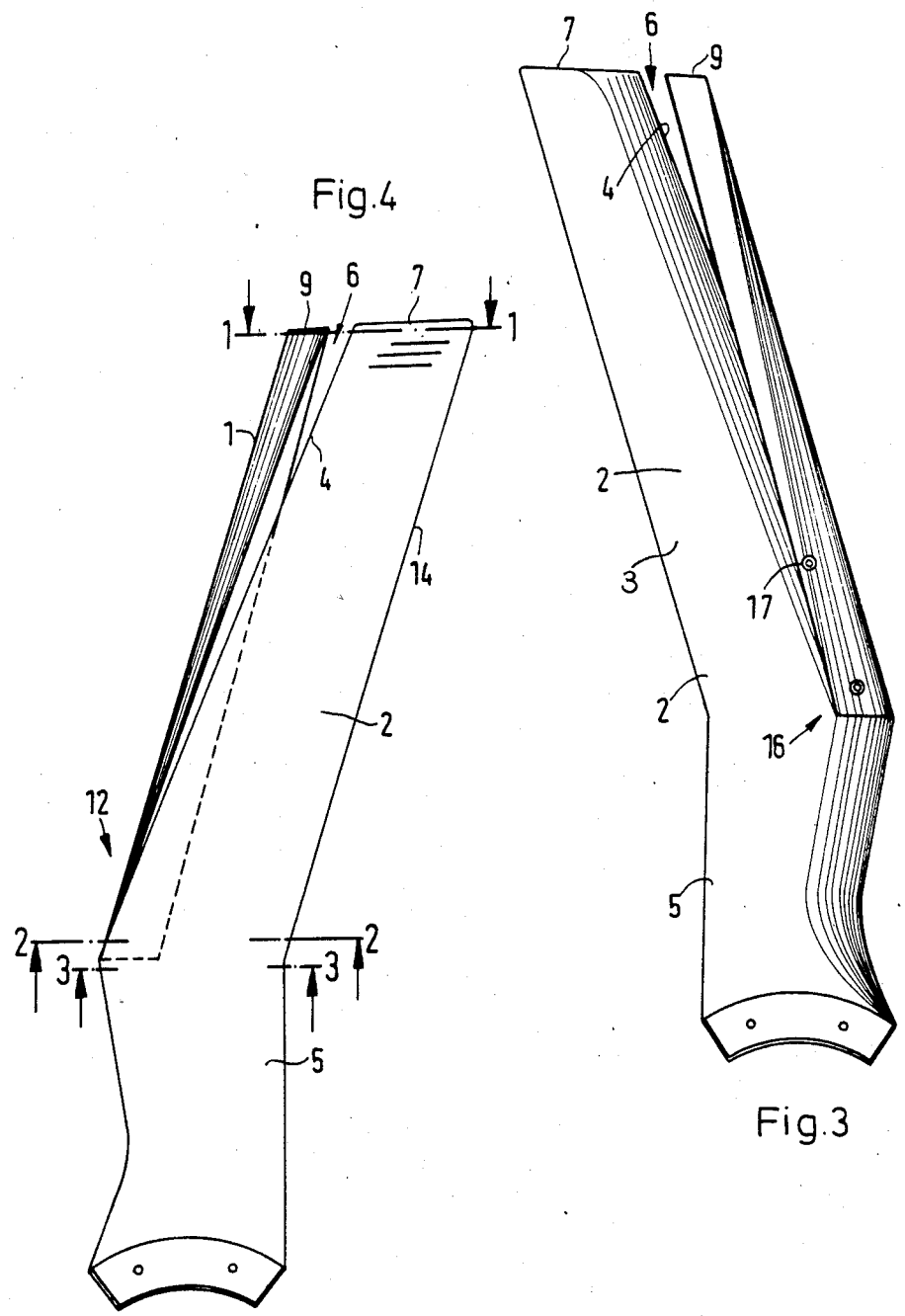

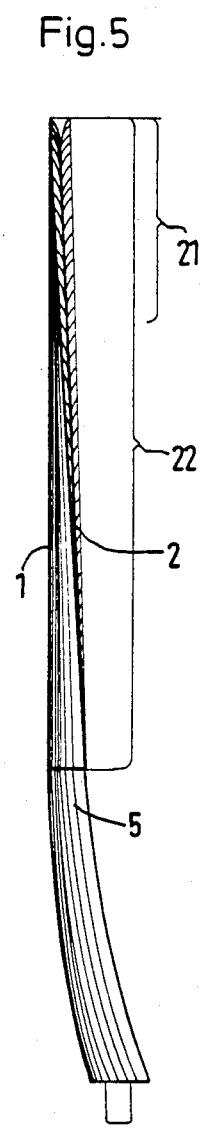
Fig. 5
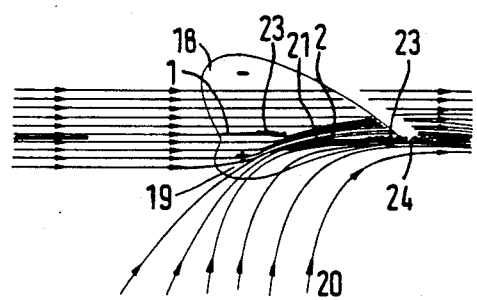
Fig. 6a (1-1)
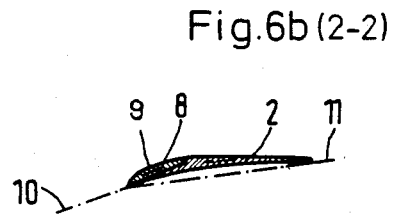
Fig. 6b (2-2)
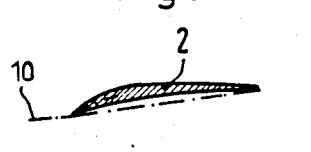
Fig. 6c (3-3)

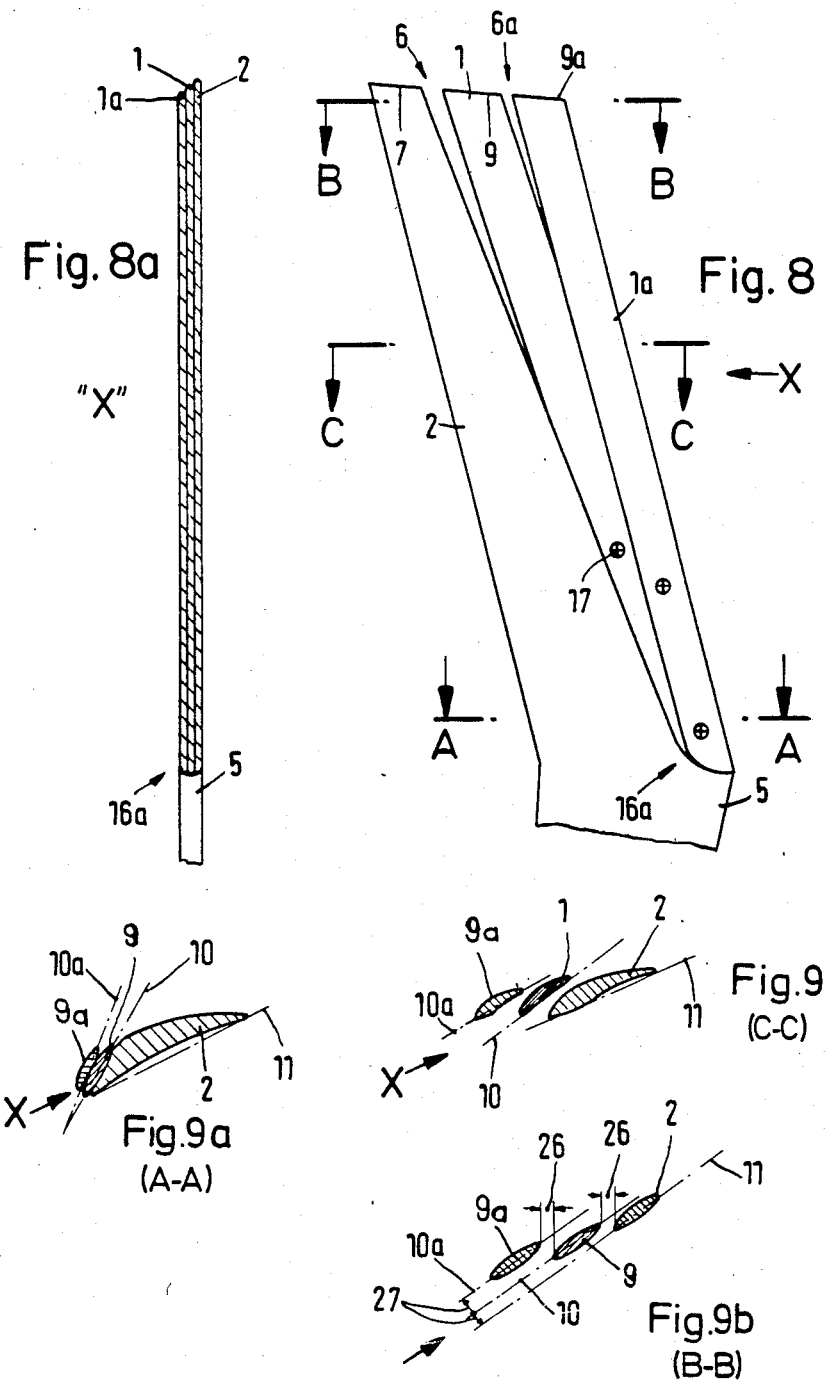

METHOD AND DEVICE FOR DECREASING THE FLOW RESISTANCE ON WINGS PARTICULARLY AEROFOILS AND BLADES OF TURBOMACHINES EXPOSED TO GAS FLUX SUCH AS AIR

This is a continuation of application Ser. No. 432,943, filed Sept. 27, 1982 now abandoned.

The present invention relates to a method for reducing the flow resistance of wings, particularly airfoils and blades of turbomachines around which flow gases, such as air or the like, and to a device for performing the method.

When air or some other gaseous fluid flows around the wings of the aforementioned type, the problem exists that a flow can only be obtained with a limited resistance if in the vicinity of the wing profile vortex formations are avoided or at least minimized, because flow eddies considerably increase the flow resistance of the wing. In the case of airfoils the problem exists in that in the approach flow area of the profile, the laminar interface changes over from a laminar into a turbulent flow over the profile depth, so that in the rear area of the airfoil profile a vortex area is formed. In addition, at the edge of the airfoil pressure differences in the flow on the upper and lower surfaces of the airfoil lead to marginal vortexes, which slope downwards towards a vortex train. In order to limit the effects of these features, it has already been proposed to arrange special flaps on the leading and/or trailing edge of the wing and by means of which energy is supplied to the flow on the top of the profile by induction action. Although this energy supply displaces the separation point of the flow towards the trailing edge of the wing, it cannot eliminate it. A particular disadvantage of these flaps is that when they are extended the fineness ratio of the airfoil profile is in part considerably impaired. For preventing marginal vortexes it is also known to provide vertical auxiliary wings at the wing ends which, although reducing vortex formation, increase the flow resistance. In order to minimize the flow losses in the case of blades and which consists of the separation and turbulence losses, it is known to twist or warp the blades over their length, in order to prevent a breakaway of the flow from the blades and consequently turbulent vortex formation by an oblique incidence of the flow in the front area of the profile. In the rear area and at the free end portion of the blades, turbulence occurs in the same way as on the airfoil and the magnitude thereof is dependent inter alia on the flow velocity. It has therefore already been proposed to pivot the blades in the vicinity of the blade base in order to counteract breaking away of the flow by varying the angle of incidence. However, this requires high constructional, manufacturing and control expenditure and increases the failure property of a turbomachine equipped with such blades.

The object of the invention is to provide a device making it possible, without using special flaps, to influence the flow round profiles of wings, particularly airfoils and blades of turbomachines in such way that the separation point of the laminar wing length is displaced towards the trailing edge of the wing. According to the invention this object is achieved in that gas flowing in front of the leading wing edge is compressed and is expanded on the upper surface of the wing, so that through induction of the expanded gas, gas from the area of the lower surface of the wing is admixed and, simultaneously, the flow on the upper surface of the wing is increased and directed in such a way that the velocity of the gas flowing out at the trailing edge of the wing is identical over the wing length. The separation point of the flow is displaced towards the trailing edge of the wing and, in the direction of the edge of the wing, the pressure of the gas flowing over the upper surface of the wing is increased.

According to a further development of the invention, the device for obtaining the compression ratios sought on a wing according to the invention is characterized in that one or more blades are arranged on the top surface of the wing in the vicinity of its leading edge and are integrated into the profile of the root of the wing and are uniformly twisted over its length in such a way that (a) the distance between the blade and the wing and optionally between the blades is widened to a gap of maximum width at the edge of the wing, (b) the mean camber line of the blade has a maximum camber at the root of the wing and is flat at the free edge, (c) and the chord of each blade to the chord of the wing is generally parallel from the base of the blade to the edge thereof.

By means of the blade shown in the drawings, the blade and its function will be further illustrated. The drawings show:

FIG. 1 a blade in top side view.

Figure 2:
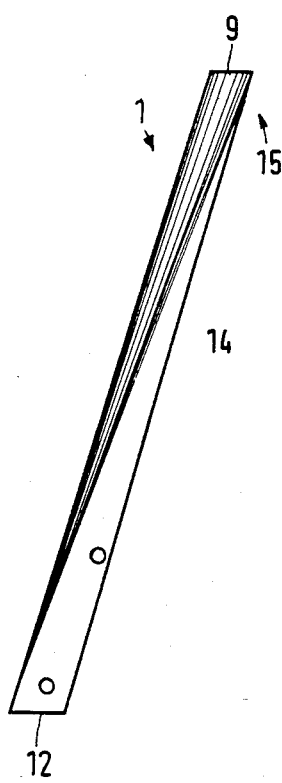

FIG. 2 the blade of FIG. 1 in bottom side view.

FIG. 3 a wing with a blade according to FIG. 1 in top side view.

FIG. 4 the wing according to FIG. 3 in a bottom side view.

FIG. 5 the wing of FIG. 3 in a front view.

FIGS. 6a to 6c cross-sectional views of the wing taken along the lines 1—1, 2—2, and 3—3, respectively, of FIG. 4.

Figure 7:
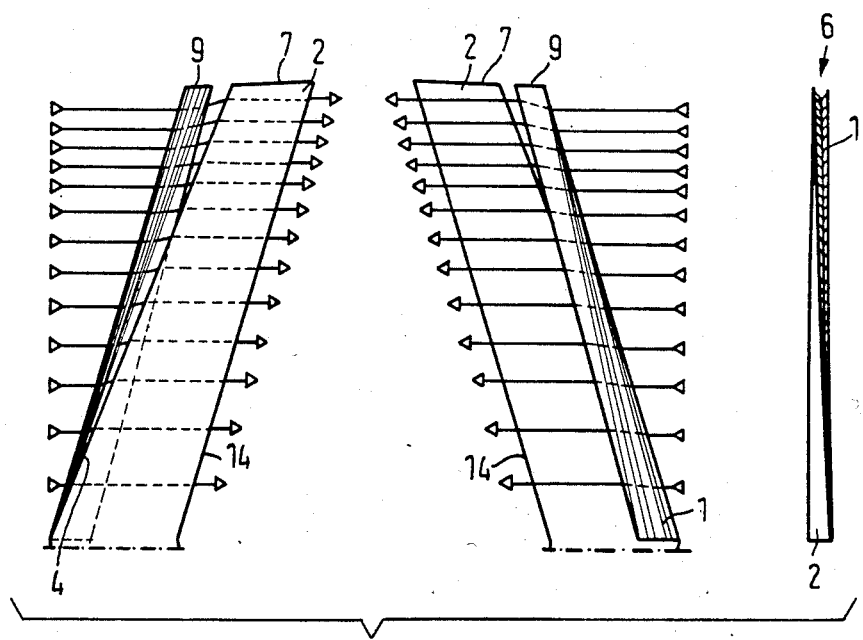

FIG. 7 a diagrammatic representation of the flow regulation according to the invention.

FIG. 8 a top side view of a wing with two blades.

FIG. 8a the wing according to FIG. 8 in a partially broken away cross sectional view FIGS. 9a to 9c cross-sectional views taken along the lines A—A, B—B, and C—C, respectively of FIG. 8.

The element 1 has the general configuration of a blade and is twisted over its length (FIGS. 1 and 2). As shown in FIGS. 3 to 5, the blade 1 is arranged on the top surface 3 of the wing in the vicinity of its leading edge 4. Blade 1 has a negative angular sweep towards the leading edge 4 of the wing that the trailing edge 14 of the blade 1 is located in the vicinity of its free end portion 15 in the flow direction in front of the leading edge 4 of the wing. As a result of the uniform twisting of blade 1 over its entire length the distance between blade 1 and wing 2 is widened to a maximum width gap 6 at edge 7 of wing 2. A root 5 of wing 2, the mean camber line 8, see FIG. 6b, of blade 1 has a maximum camber whereas it is flat at the free edge. Chord 10 of blade 1 is oriented in a negative angle to chord 11 of wing 2 at base 12 of blade 1 and in a positive angle at the edge of blade 1 (FIGS. 6a to 6c).

Base 12 of blade 1 is mounted in a recess 16 of wing 2, where it is fixed by means of screw connections 17. Recess 16 is constructed in such a way that it is possible to embed base 12 of blade 1 in a flow-favourable manner. It is also possible to pivotably adjustably mount blade 1 in recess 16 by means of an adjusting device. This makes it possible to adapt the position of blade 1 for different operating conditions. Furthermore it is possible to provide on wing 2 a plurality of blades 1 having a negative sweep in the approach flow direction, in order to achieve further thrust increase of wing 2.

Through the use of the blade 1 on wing 2 is formed in each case one underpressure zone 18 and overpressure zone 19 advanced towards the leading edge 4 of the wing. The overpressure zone 19 is formed on the bottom of the blade 1 and leads to a pressure compensation through gap 6 by means of the outflowing medium. This pressure compensating flow induces a further gas supply from pressure zone 20 below wing 2, which is admixed with the inflowing gas. The gas flowing on the top surface of with wing is so oriented by pressure compensation that the velocity of the gas flowing away at the trailing edge of the wing is the same over its entire length and the separation point of the flow is displaced towards the trailing edge of the wing (FIG. 7). In addition, the pressure of the gas flowing over the upper surface of the wing is increased in the direction of edge 7. This leads to a reduction of the pressure gradient and edge 7 and consequently to the formation of smaller vortex trains 24, so that the induced resistance of the overall profile is reduced. In the vicinity of the edge, an area of increased flow velocity is formed, so that the separation point in the turbulent interface is moved out over the profile of wing 2. Simultaneously the vorticity field at the rear wing area is reduced.

Through the construction of blade 1 and its arrangement on wing 2, it is consequently possible by energy supply to compress the gas flow located on the upper surface of the wing and to increase the area of laminar flow; whilst reducing the vorticity flows, the result being that the thrust obtainable is increased.

It is also possible to arrange one or more blades according to the invention on a wing 2 which, in per se known manner, is rotatable by means of an adjusting device for varying the angle of incidence at the base or root of wing 2. As a result it is possible to still further increase the efficiency improvement of the profile of wing 2 obtained by adapting the angle of incidence to the ideal approach flow, because here again the blade or blades improve the flow round the profile of wing 2 by minimizing vortex formation. As a result of the individual adjustment possibility of each blade, the flow round the profile can be further optimized in the case of wings 2 variable with respect to the angle of incidence.

FIG. 8 shows a wing 2, which is connected to two blades 1, 1a fixed in a recess 16a on root 5 of wing 2. They are arranged in such a way that they extend forwards with respect to the leading edge 4 of the wing. In addition, edges 9, 9a of blades 1, 1a are raised towards the top of the profile with respect to edge 7 of wing 2. As a result between the blades 1, 1a and wing 2 free flow cross-sections 27 are formed in the approach flow direction and pressure compensating cross-sections 26 at right angles to the approach flow direction. As shown in FIGS. 9a to 9c, wing 2 and blades 1, 1a are also cambered. The camber has a maximum in the vicinity of root 5, whilst the cross-sections of blades 1, 1a and wing 2 are flat at edges 9, 9a, 7. In this area blades 1, 1a are almost symmetrical. Whereas the chords 10, 10a of blade 1, 1a are at a positive angle to chord 11 of wing 2 at root 5, chords 10, 10a of blades 1, 1a are approximately parallel to the wing chord 11 in the vicinity of edges 9, 9a due to the prevented profile cambering. This arrangement of the blades 1, 1a on a wing 2 shows in FIGS. 8 and 9a to 9c permits a particularly great efficiency increase.

It is also possible to use the aforementioned flow blades 1, 1a for increasing the efficiency of marine propellers. In this case a blade 1 or several blades 1, 1a is or are associated with the propeller blade. In general each blade 1, 1a can be curved in accordance with the leading edge of the associated propeller blade. Through the use of blades 1, 1a the risk of cavitation of such propellers is considerably reduced, because critical underpressures at the propeller edges are avoided. It is also possible to use blades 1, 1a are associated with each propeller blade. Through the use of blades 1, 1a the problems caused by local sound velocities in the edge area of propellers are avoided.

I claim:

1. A device for use with fluid flow engines comprising:
   a foil member (2) with a root (5) and a tip (7), said member having a fluid flow foil cross sectional configuration with upper and lower surfaces and a chord line (11) connecting leading (4) and trailing edges;
   at least one blade (1, 1a) arranged on the upper surface of said foil member adjacent the leading edge thereof, said blade having a fluid flow cross sectional configuration with a chord line (10, 10a) connecting leading and trailing edges, said blade having one end (12) integrally mounted in said root (5) of said foil member (2) so that said blade extends at an angle from said leading edge (4) of said foil member to form a gap (6, 6a) between the other end (9, 9a) of said blade and the tip (7) of said foil member, said gap diverging in a direction away from said root of said foil member, said blade being formed such that the position of the chord line (10, 10a) of said blade changes with respect to the chord line (11) of said foil member between the region proximate said one end (12) of said blade and the region proximate said other end (9, 9a) of said blade, said fluid flow cross section of said blade having a greater camber proximate said one end than said other end said chord line (10, 10a) of said blade converging with the chord line (11) of said foil member toward said leading edge (4) in the region proximate to said one end (12) of said blade and diverging in the region proximate said other end (9, 9a) of said blade, said other end (9, 9a) of said blade (1, 1a) terminating coextensively with the tip (7) of said foil member (2), said blade (1, 1a) being shaped in conformity with said leading edge (4) of said foil member and said other end (9, 9a) of said blade being above said tip (7) of said foil member (2) wherein said foil member and blade are negatively swept.

2. The device according to claim 1 wherein said one end (12) of said blade (1, 1a) is mounted in a recess (16) of said foil member (2).

3. The device according to claim 1 wherein said blade is pivotally mounted on said foil member at said one end (12).

4. The device according to claim 1 wherein said other end (9, 9a) of said blade is parallel to said tip of said foil member.

5. The device according to claim 1 including a plurality of blades arranged on the upper surface of said foil.

* * * * *